US008675257B2

(12) United States Patent
Jia et al.

(10) Patent No.: US 8,675,257 B2
(45) Date of Patent: Mar. 18, 2014

(54) AUTOMATIC TRAPPING METHOD AND SYSTEM

(75) Inventors: Wenhua Jia, Beijing (CN); Min Liu, Beijing (CN); Pingli Li, Beijing (CN); Jianjun Jiang, Beijing (CN)

(73) Assignees: Founder International Co. Ltd., Beijing (CN); Peking University, Beijing (CN)

( * ) Notice: Subject to any disclaimer, the term of this patent is extended or adjusted under 35 U.S.C. 154(b) by 538 days.

(21) Appl. No.: 12/997,597

(22) PCT Filed: Dec. 25, 2008

(86) PCT No.: PCT/CN2008/002078
§ 371 (c)(1),
(2), (4) Date: Dec. 12, 2010

(87) PCT Pub. No.: WO2009/152655
PCT Pub. Date: Dec. 23, 2009

(65) Prior Publication Data
US 2011/0090522 A1    Apr. 21, 2011

(30) Foreign Application Priority Data

Jun. 16, 2008  (CN) .......................... 2008 1 0114982

(51) Int. Cl.
*G06K 15/00*    (2006.01)
(52) U.S. Cl.
USPC ............. 358/2.1; 358/1.9; 358/518; 358/538; 345/589; 345/592; 345/593; 345/624; 345/629; 382/163; 382/164; 382/167; 382/266
(58) Field of Classification Search
USPC ............ 358/1.9, 2.1, 515, 518, 538; 345/589, 345/592, 593, 624, 629; 382/163, 164, 167, 382/266
See application file for complete search history.

(56) References Cited

U.S. PATENT DOCUMENTS

| 5,542,052 | A  | * | 7/1996 | Deutsch et al. ............... 345/589 |
| 7,088,469 | B1 | * | 8/2006 | Sanger et al. ................. 358/1.9 |
| 2006/0033960 | A1 |  | 2/2006 | Allen |
| 2008/0007752 | A1 | * | 1/2008 | Gandhi et al. ................. 358/1.9 |
| 2008/0158614 | A1 | * | 7/2008 | Segawa ........................ 358/3.29 |

FOREIGN PATENT DOCUMENTS

| JP | 2007068048 A  | 3/2007 |
| WO | 2007026953 A1 | 3/2007 |
| WO | 2007127239 A2 | 11/2007 |

OTHER PUBLICATIONS

Office Action, for counterpart Chinese application, Automatic Trapping Method and System, App. No. 200810114982.1, received Oct. 9, 2010.

(Continued)

*Primary Examiner* — King Poon
*Assistant Examiner* — Jamares Q Washington
(74) *Attorney, Agent, or Firm* — US-China Intellectual Property Counsel, PLLC

(57) ABSTRACT

An automatic trapping method and system is used for packaging printing. The method includes translating trapping objects into simple color blocks, scanning all of the blocks and attaining trapping boundaries, determining whether the color blocks on both sides of the trapping boundaries meet the trapping rule depending on the ink dots percentage and luminance, connecting trapping boundaries by analyzing regions, creating trapping zone and filling ink into the zone and reducing color.

22 Claims, 6 Drawing Sheets

(56) References Cited

OTHER PUBLICATIONS

Notice of Allowance, for counterpart Chinese application, Automatic Trapping Method and System, App. No. 200810114982.1, received Mar. 1, 2011.

Office Action, for counterpart Japanese application, Automatic Trapping Method and System, App. No. 2011-512809, received Feb. 14, 2012.

Notice of Allowance, for counterpart Chinese application, Automatic Trapping Method and System, App. No. 2011-512809, received Sep. 25, 2012.

* cited by examiner

AUTOMATIC TRAPPING METHOD AND SYSTEM

REFERENCES TO RELATED APPLICATIONS

This application claims priority to PCT Patent Application No. PCT/CN2008/002078, entitled "Automatic Trapping Method and System" filed Dec. 25, 2008 and published Dec. 23, 2009, publication No. WO2009/152655A1; which further claims priority to Chinese patent application No. 200810114982.1, entitled "An Automatic Trapping Method and System," filed Jun. 16, 2008, all of which are incorporated by reference herein.

FIELD OF INVENTION

The invention relates to the technology field of publishing and printing, particularly, concerns a method and a system for automatic trapping.

BACKGROUND OF THE INVENTION

Chromatography is the printing in the case that the corresponding region of the previous color plate is knocked out during the printing process. Misregistration often occurs in multicolor chromatography, especially in flexography. Misregistration causes gaps to appear in the edge of two adjacent color blocks. In order to avoid those gaps, it is necessary to generate some small overlaps, also known as trapping regions, between the edges of different objects so that they are unnoticeable to human eyes.

Trapping is customarily called amending color trapping in the printing industry. It is mainly to amend the boundaries between two adjacent different colors caused by misregistration. People always feel that dark color is closer to eyes than light color when looking at a printing. Therefore, when trapping is made to original printings, people always try to make the light color to be covered by the dark color, and keep the dark color the same. Thus, even if a small offset appears due to misregistration, the overlapped printing would prevent the shape of the objects from being distorted.

There are two major trapping methods. One is manual trapping. Manual trapping is neither efficient nor effective. Another method is automatic trapping based on adjacent colors only. That trapping method takes account of adjacent color block pairs only. Although it can make one-to-many trapping regions connections when trapping borders are adjacent, and trapping direction are the same, it can not make many-to-one or many-to-many trapping regions connections. U.S. Pat. No. 7,123,381B2 discloses a trapping method based on a single trapping border, but it fails to make a connection of all trapping borders. Thus, the automatic trapping method based on adjacent color block pairs needs to be improved.

BRIEF SUMMARY OF THE INVENTION

This invention advances the art and overcomes the problems outlined above by providing a method and a system for automatic trapping based on region analysis.

This invention provides a method for automatic trapping, comprising: (1) translating trapping objects into simple color blocks; (2) obtaining the pubic boundaries of adjacent color blocks, namely the trapping boundaries, by scanning all the color blocks; (3) determining whether the color blocks around the trapping boundaries satisfy the condition for trapping or not, and if not, dropping these color blocks; (4) performing region analysis by setting a central color block and analyzing its relations with all other surrounding color blocks to make trapping edge connections; (5) generating trapping region shape, filling ink and subtracting ink for trapping region.

In another embodiment, step (1) of the method mentioned above comprises first processing the trapping objects to obtain simple objects consisting of flat screen, gradients, mixed objects and images; then translating the mixed color mode and transparency information of the simple objects into overprint effect; and lastly combining and segmenting the results to obtain simple color blocks.

In another embodiment, step (3) of the method mentioned above comprises determining whether the color blocks around the trapping edge satisfy the conditions for trapping or not based on ink dots percentage and luminance, wherein said conditions consist of color trapping condition and pullback trapping condition.

In another embodiment, when making trapping condition determinations in step (3), if the region near the trapping edge of a color block in color pairs has no ink, then pullback trapping condition should be applied. Otherwise, color trapping condition should be applied.

In another embodiment, the region analysis in step (4) of the method mentioned above comprises carrying out firstly one-to-many trapping edge connections, then many-to-one trapping edge connections, and lastly, many-to-many trapping edge connections.

In another embodiment, the trapping region shape generating step of step (5) of the method mentioned above comprises a step to determine whether the conditions for generating a smooth transition trapping region are satisfied or not. The determination step comprises combining multiple entering color blocks as the new entering color blocks, and multiple entered color blocks as the new entered color blocks for the trapping boundaries which are undergoing trapping edge connections, and then determining if the conditions for generating a smooth transition trapping region are satisfied or not.

In another embodiment, if the conditions for generating a smooth transition trapping region are satisfied, then the trapping region generating step in step (5) further comprises firstly dissecting trapping edge to generate satellite lines on both sides of the trapping edge; then determining the shape of two-sides satellite lines along dissection points on the trapping boundaries by adjusting the location of the corresponding points on two-sides satellite lines according to two-sides luminance, and finally generating trapping region shape according to the endpoint type and cutting mode.

In another embodiment, if the conditions for generating a smooth transition trapping region are not satisfied, then the method in step (5) comprises generating satellite lines along the parallel line segments at the side of the entered color block according to the trapping edge obtained by trapping parameters, and then generating trapping region shape according to the endpoint type and cutting mode.

In another embodiment, the filling and subtracting trapping ink step in step (5) comprises first determining whether or not trapping connections need to be made, and if yes, dividing the trapping boundaries generated from trapping region connections, and then filling and subtracting ink according to different trapping types.

A system for automatic trapping is also provided, comprising: (1) a trapping objects color blocking module which is configured to translate trapping objects into color blocks; (2) a trapping edge positioning module which is configured to obtain the pubic boundaries of adjacent color blocks (also called the trapping boundaries) by scanning all the color blocks; (3) a trapping determining module which is configured to determine whether the color blocks around the trapping edge satisfy the trapping conditions or not; (4) a region analyzing module which is configured to execute region analysis by setting a central color block and combining the relations with all the surrounding color blocks to conduct trapping edge connections; (5) a trapping conducting module which is configured to generate trapping region shape, fill ink and subtract ink for trapping regions.

In one embodiment, the trapping determining module determines whether the color blocks around the trapping edge satisfy the conditions for trapping or not based on ink dots percentage and luminance, wherein said determination conditions include color trapping condition and pullback trapping condition.

In another embodiment, the region analyzing module carries out firstly one-to-many trapping edge connections then many-to-one trapping edge connections, and lastly many-to-many trapping edge connections.

This invention has the following advantages: The method and system disclosed in this invention solves the problem of isolation and poor connections between trapping areas in existing technologies and improves the overall printing visual appearance by determining whether the color blocks around the trapping edge satisfy the conditions for trapping or not on the basis of ink dots percentage and luminance, and connecting the trapping region boundaries by trapping edge connection analysis.

DETAILED DESCRIPTION

The following detailed description to the drawings and examples provides a more detailed disclosure of the present invention.

Figure 1:
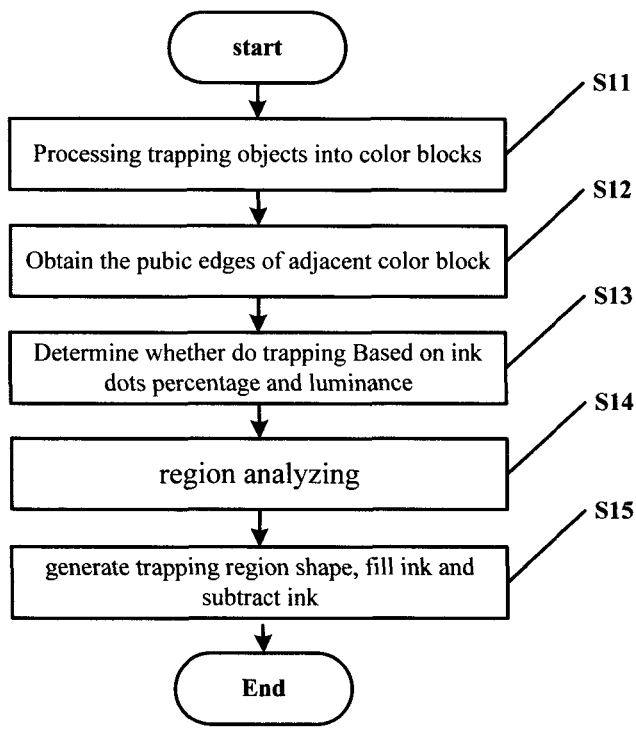
FIG. 1 is a flow chart illustrating the method for automatic trapping according to this invention.

A method for automatic trapping, as shown in the flowchart of FIG. 1, including the following steps:

(1) Processing trapping objects into color blocks.

a. According to the trapping parameters set by user, processing flat screen, gradients, images, designs, grids, characters, symbols, transparency, clipping masking, opacity masking, multideck objects, monolayer-objects, mixed objects special effect and so on to obtain simple objects, namely simple objects consisting of flat screen, gradients, mixed objects and images. All those processes, as well as processes such as stroking and filling in separation, separating designs into simple objects, inserting external objects, scattering characters into simple path and so on, are all well-known knowledge in the field.

b. Translating the mixed color mode and transparency information of simple objects into overprint effect.

c. Combining and segmenting the result of step (b) to obtain simple color blocks.

Figure 5:
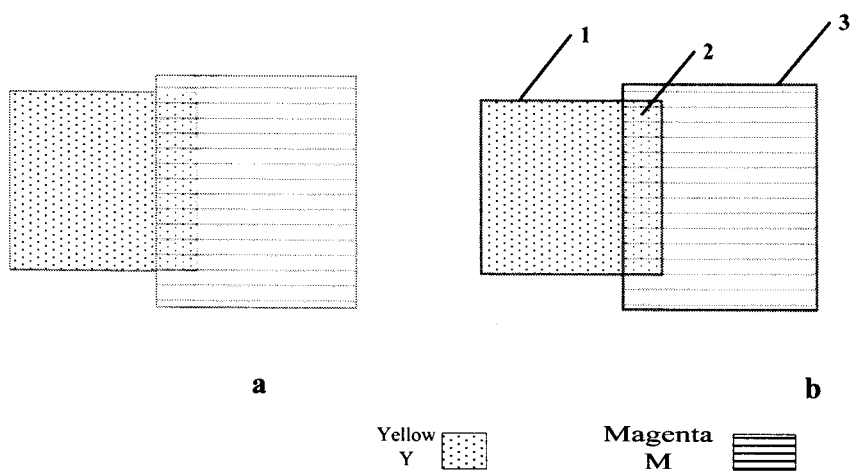
FIG. 5 illustrates how to do color blockings according to this invention

After the processing, the obtained simple color blocks appear in either adjacent or nonadjacent positions. As shown in FIG. 5, figure a) is a graphic example before color-blocking, wherein a variety of colors appears mixed. After color-blocking, it has been transformed into simple adjacent color blocks as shown in figure b). Color block 1 is yellow, while color block 2 is red and color block 3 is magenta.

(2) Obtaining the trapping edge. Obtain the trapping edge by scanning all the color blocks and obtaining the pubic boundaries of adjacent color blocks, also called the trapping edge.

(3) Determining whether to conduct trapping or not based on ink dots percentage and luminance.

Determine whether the color blocks around the trapping edge satisfy the trapping conditions or not based on ink dots percentage and luminance. If the trapping conditions are not satisfied, drop those color blocks. There are two types of trapping conditions, namely color trapping condition and pullback trapping condition. Pullback trapping condition is applied if the regions near the trapping edge of a color block in color pairs have no ink. Otherwise, color trapping condition is applied.

For the purpose of determining trapping condition, color block ink refers to the ink within the region where the distance from the trapping edge is no more than the setting value D. The ink dots percentage is the average ink dots percentage within the region where the distance from the trapping edge is no more than the setting value D. The value of D is less than or equals to the trapping width. In one embodiment, D is set to be the trapping width.

a. Color trapping condition is determined by ink dots percentage.

If color block A does not have the same printing ink as color block B, then trapping should be performed between the two color blocks. If color block A and color block B has the same printing ink, then trapping should be performed if the following two conditions are met:

I) Color block A and color block B have at least two kinds of the same printing ink which meet the qualification |InkS(A)−InkS(B)|>Minimum Ink Difference, wherein the Minimum Ink Difference (which is the difference of minimum printing ink set by user) could be any value ranging from 0% to 100%.

II) Calculate the difference of percentage InkS(A)−InkS(B) for each of the two kinds of the same printing ink dots that satisfies condition I. The two values obtained from the calculation must be a positive number and a negative number, respectively.

In the above calculation, (InkS(A)−InkS(B)) is the dot percentage difference of same ink S. As for ink S, the dot percentage difference is the result of the dot percentage of ink S in color block A minus the dot percentage of ink S in color block B.

For example: the ink dot percentage of color block A is C 20%, M 50%. The ink dot percentage of color block B is C 30%, M 20%. C represents cyan while M represents magenta.

Color block A and color block B has the same ink. For cyan ink C: InkC(A)−InkC(B)=20%−30%=−10%, the value is negative. For magenta ink M: InkM(A)−InkM(B)=50%−

20%=30%, the value is positive. If the Minimum Ink Difference is 5%, then color block A and color block B satisfy the condition for color trapping.

In the same example, if color block A and color block B has one kind of same ink, then perform the determination according to condition I and II. For any ink that is not in a color block, treat the ink dot percentage as 0% and continue the determination.

Trapping direction is determined by luminance. Specifically, first convert the ink components of two color blocks into LAB color space to obtain the luminance, then perform trapping from the color block with higher luminance value towards the color block with lower luminance value. Light colors have higher luminance values and heavy (dark) colors have lower luminance values.

b. Pullback trapping condition is satisfied if the followings are met:

I) Take out the inked color block from the color blocks around the trapping edge. Convert the ink components of said color block into LAB color space and calculate the total luminance L, the heaviest ink luminance L1 and the lightest ink luminance L2. The ink with the lowest luminance is called the Heaviest Ink while the rest of the inks are called Light Inks.

II) The ink dot percentage of the Heaviest Ink must be greater than 45% and the luminance of the Heaviest Ink must be less than 65.

III) If the difference value, $\Delta L$, between L2 and L, is within the range of a set value, then the pullback trapping condition is satisfied. The range of the set value usually is $15<\Delta L<90$.

Trapping direction is from the block that has no ink towards the color block that has ink around the trapping edge.

(4) Region Analysis

Region analysis is to set a central color block and then combine the relations with all the surrounding color blocks to conduct trapping edge connections.

Firstly, perform one-to-many trapping edge connections. For each color block, obtain all the outward trapping boundaries from said color block. If two outward trapping boundaries are adjacent, then connect the two trapping boundaries as a new trapping edge.

Secondly, perform many-to-one trapping edge connections. As for each color block that did not receive trapping edge from the one-to-many trapping edge connection step, take out all the inward trapping boundaries from said color block. If two inward trapping boundaries are adjacent, then connect the two trapping boundaries as a new trapping edge.

Lastly, perform many-to-many trapping edge connections. For a certain trapping edge which did not perform said one-to-many or many-to-one trapping edge connections, obtain a trapping edge with common points with said trapping edge. If two trapping boundaries have the same trapping direction, then connect the two trapping boundaries as a new trapping edge. Repeat above steps until it can no longer connect.

(5) Perform trapping

Figure 2:
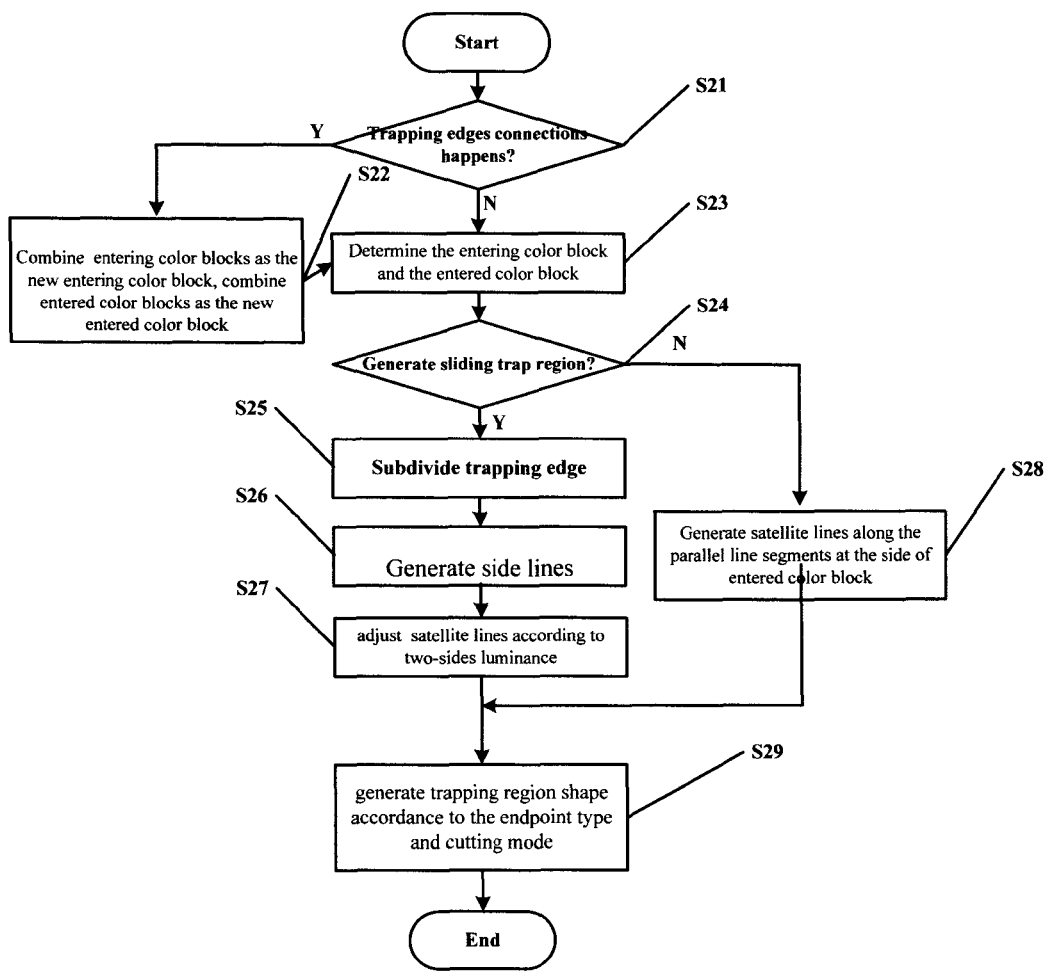
FIG. 2 is a flow chart for generating trapping region shape according to an embodiment of this invention.

Firstly, generate trapping region shape, as shown in the flowchart in FIG. 2.

S21: Determine whether to perform trapping connections or not. If yes, turn to S22, otherwise turn to S23;

S22: Combine multiple entering color blocks as the new entering color blocks, and combine the entered color blocks as the new entered color block;

S23: Determine the entering color block and the entered color block;

S24: Determine whether it is needed to generate smooth transition trapping region or not. If yes, turn to S25, otherwise turn to S28;

S25: Define a number of N dissection points on the trapping edge and dissect the trapping edge, wherein the dissection points dissect the trapping edge equally.

S26: According to the trapping parameters, generate two parallel line segments which are located on both sides of the trapping edge and which are parallel with the trapping edge. Those two parallel line segments make two original satellite lines, and each dissection point on the trapping edge matches with the corresponding point on the satellite lines. In addition, the dissection point and the two corresponding points locate on the same line. Said parallel line segments and trapping edge are of the same shape and the distance between them is the trapping width.

S27: Finally determine the shape of two-sides satellite lines along the dissection points on the trapping boundaries by adjusting the location of the corresponding points on the two-sides satellite lines according to the two-sides luminance. Turn to S29.

Figure 6:
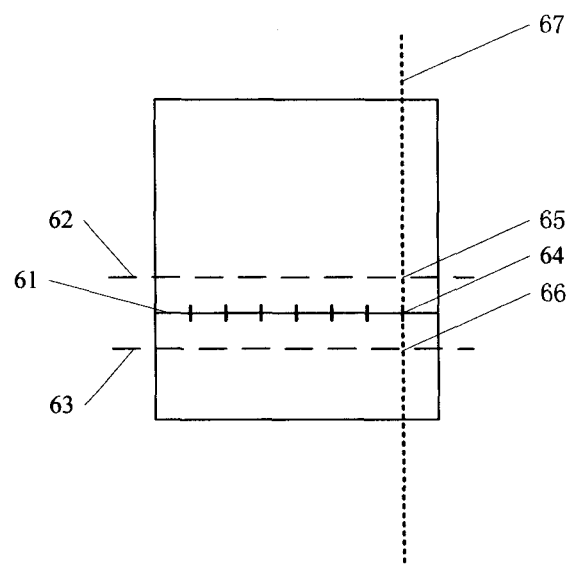
FIG. 6 illustrates how to do smooth translating trapping according to this invention.

As for smooth transition trapping, the user decides whether it is needed to conduct smooth transition trapping for the gradients or not. The specific method for generating region shape for gradient trapping is shown in FIG. 6. The two-sides satellite lines are 62 and 63 respectively. Specific trapping steps are as below:

Calculate the color block luminance L of a certain dissection point Q64 on both sides of the trapping edge 61. Set the lower luminance value as L1, and the corresponding dissection point on the other side of the satellite line as Q1. Set the higher luminance value as L2, and the corresponding dissection point on the said side of satellite line as Q2;

Calculate Z=L1/L2. If Z<=Sliding Limit, then Q165 remains the same and adjust Q266 to coincide with dissection point Q along line 67. Said line passes dissection point Q and the corresponding points Q1 and Q2 on the satellite line.

If Z>Sliding Limit, adjust the corresponding points Q1 and Q2 of dissection points on the two-sides of satellite line. Make sure that Q1 and Q2 satisfies the following conditions simultaneously:

$$Q2Q|L2=|QQ1|L1,|Q1Q|+|QQ2|=\text{trapping width}$$

Sliding Limit is called the smooth transition parameter that is set by the user, it can be a random value ranging from 0% to 100%.

Figure 7:
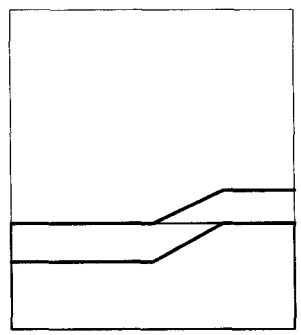
FIG. 7 illustrates the effect of obtaining two-sides satellite lines of smooth translation trapping boundaries after making adjustment according to an embodiment of this invention.

Finally determine the shape of the two-sides satellite lines after making adjustment. FIG. 7 illustrates the effect of the satellite lines shapes on both sides of trapping edge after making adjustment according to the present embodiment of this invention.

S28: Generate satellite lines along the parallel line segments at the side of entered color block according to the trapping edge obtained by trapping parameters. Said parallel line segments and the trapping edge are of the same shape and parallel. The distance between them is the trapping width.

S29: Generate trapping region shape accordance to the endpoint type and cutting mode. The program ends.

Endpoint types include square shape and natural extension. Said square shape is the shape which connects the trapping edge and the corresponding endpoints on the satellite lines. Said natural extension is the shape which connects the trapping edge and the corresponding endpoints on the satellite lines, after making sure that the two ends of the trapping edge enter the two tangents of the color block, and adjusting the endpoints of the satellite lines to make the endpoints fall over the tangent.

Cutting modes include edge cutting and axial cutting. When the entered color block is being trapped by another color block, edge cutting refers to cutting along the edge of the entered color block, if the new color block exceeds the edge of the entered color block, so that the trapping region is within the entered color block. Axial cutting refers to cutting along the central axis of the entered color block to make sure the trapping region does not exceed the center of the entered color block.

Figure 4:
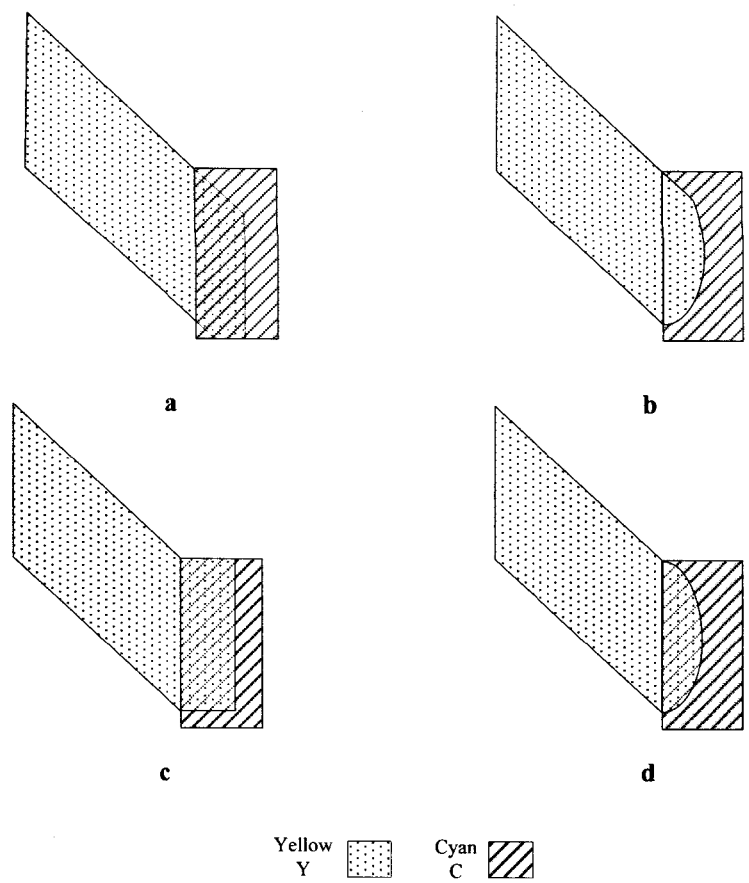
FIG. 4 illustrates how to generate trapping region shapes based on the shape and cutting method of all endpoints types according to an embodiment of this invention.

Take a yellow block and a cyan block for example, the yellow color block is the entering color block and the cyan color block is the entered color block. As shown in FIG. 4, a) illustrates the trapping contours obtained after natural extension and edge cutting; b) illustrates the trapping contours obtained after natural extension and axial cutting; c) illustrates the trapping contours obtained after square shape and edge cutting; and d) illustrates the trapping contours obtained after square shape and the axial cutting.

Figure 3:
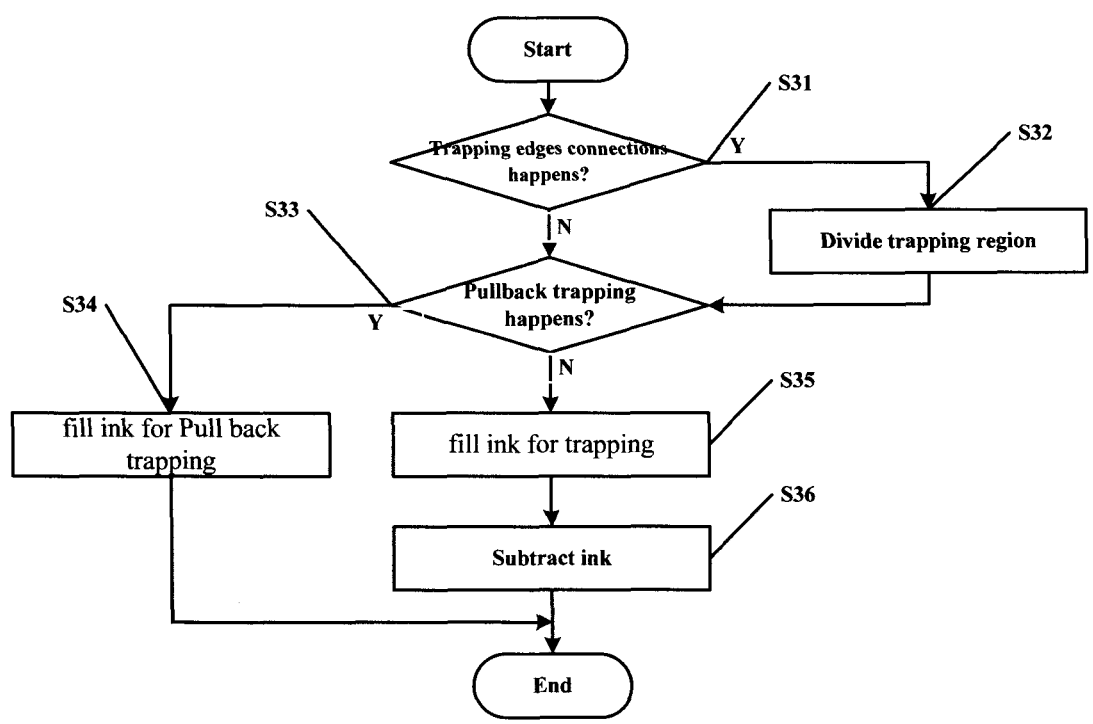
FIG. 3 is a flow chart of filling and subtracting ink according to an embodiment of this invention.

Flow chart for filling and subtracting ink of the trapping region is shown in FIG. 3:

S31: Determine whether to make connections between the trapping boundaries, if yes, then execute S32, otherwise execute S33;

S32: Dissect the formed trapping edge according to different connection types of the trapping edge.

For one-to-many trapping boundaries generated after trapping region connection, dissect along the edge of the entered color block. Use one color block to dissect the whole trapping region to generate dissected trapping regions. Then generate dissected trapping regions of another color block using the same method.

For many-to-one trapping boundaries generated after trapping region connection, there are two ways to dissect the trapping regions. One is to use the angle bisect line, i.e., dissect the trapping region along the bisect line of the angle between the trapping edge connection points of the entered color block. The other way is the Area Ratio method: Draw a small circle around the connection point of the trapping edge. This small circle and two entering color blocks form two small regions with areas, S1 and S2, respectively. Locate a dividing line so that the angle between the trapping edge connection points of the entered color block is divided into two angles, a and b, according to the equation S1/S2=a/b. Use this dividing line to dissect the trapping region to obtain disserted trapping region.

As for many-to-many trapping boundaries generated after trapping region connection, either dissect the trapping regions based on the entered color block or by using the Area Ration method.

In one embodiment, the entering color block and entered color block in the steps for dividing trapping edge generated after trapping region connections are the entering color blocks and entered color blocks determined by step (3).

S33: Determine whether pullback trapping should be performed or not. If yes, turn to S34, otherwise turn to S35.

S34: Fill ink for pullback trapping: The ink filled for trapping is the darkest ink components of the entered color block, while the ink dot percentage of the other ink components is set to 0.2%. The program ends.

S35: Fill ink for color trapping, the filled ink for trapping are the ink components of the entering color block, and the percentage of its ink dot is adjusted according to trapping parameters.

The method for filling color is: if the color block is flat screen, then use the flat screen printing ink directly to fill the trapping region. If the color block is gradual, then use the gradient color to fill the trapping region. If the color block is image, then use the image pixel components to fill as flat screen. A number of small flat screens form the trapping region.

S36: The ink subtracting process: If the trapping region and entered region contain a same ink component, and the percentage of the ink dots in the trapping region is less than the ink dot percentage in the entered region, then perform the subtracting process, i.e., remove the same ink in the trapping region and end the program. In one embodiment, it is necessary to generate trapping region shape for each trapping edge, fill trapping ink, and/or subtract ink.

Figure 8:
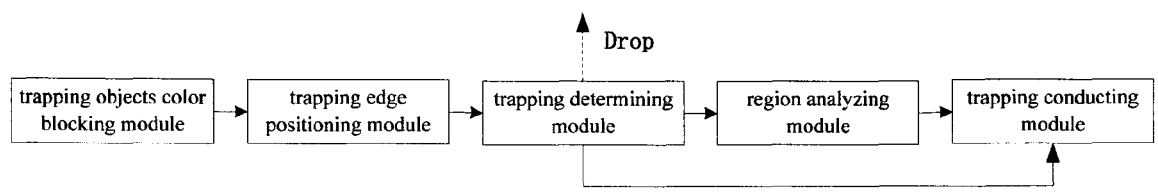
FIG. 8 illustrates the basic framework for an automatic trapping system according to this invention.

As shown in FIG. 8, the system for implementing this invention comprises the following software modules.

(1) a trapping objects color blocking module

Translate the trapping objects into color blocks to obtain simple color blocks which are in either adjacent or nonadjacent positions.

(2) a trapping edge positioning module

Obtain the pubic boundaries of adjacent color blocks, namely the trapping edge, by scanning all the color blocks.

(3) a trapping determination module

Determine whether the color blocks around the trapping edge satisfy the conditions for trapping or not based on ink dots percentage and luminance, said conditions include color trapping condition and pullback trapping condition.

(4) a region analysis module

Execute region analysis by setting a central color block and combining the relations with all the surrounding color blocks to conduct trapping edge connections. Perform one-to-many trapping edge connections first, then many-to-one trapping edge connections, and lastly, many-to-many trapping edge connections.

(5) a trapping conducting module

Generate trapping region shape, fill ink and subtract ink for trapping region.

The method and system adopted by this invention solves the problem of isolation and lack of coordination between trapping areas in existing technologies by determining whether the color blocks around the trapping edge satisfy the trapping conditions or not based on ink dots percentage and luminance, and connecting trapping region boundaries by performing trapping edge connection analysis.

Additional embodiments and features are set forth in the description that follows. Other embodiments may become obvious to those skilled in the art upon examination of the specification or from practice of the invention. It should thus be noted that the matter contained in the above description or shown in the accompanying drawings should be interpreted as illustrative and not in a limiting sense.

What is claimed is:

1. A method for automatic trapping, comprising:
   (1) translating trapping objects into simple color blocks;
   (2) obtaining the trapping edge by scanning and obtaining the public boundaries of all the adjacent color blocks;
   (3) determining whether the color blocks around the trapping edge satisfy the trapping conditions or not; and if not, dropping those color blocks;
   (4) executing region analysis by setting a central color block and combining the relations with all the surrounding color blocks to conduct trapping edge connections;
   (5) generating trapping region shape, filling ink and subtracting ink for trapping region;

wherein the determination in step 3) is based on ink dots percentage and color blocks luminance, said ink dots percentage being the average ink dots percentage within the region where the distance from the trapping edge is no more than a setting value D; wherein the setting value D is less than or equals to the trapping width; and wherein said trapping conditions consist of color trapping condition and pullback trapping condition.

2. A method for automatic trapping according to claim 1, wherein said pullback trapping condition is applied if the region near the trapping edge of a color block in color pairs has no ink, and said color trapping condition is applied in all other conditions.

3. A method for automatic trapping according to claim 2, wherein said color trapping condition is based on ink dots percentage and trapping direction is based on ink luminance.

4. A method for automatic trapping according to claim 3, wherein said color trapping condition is satisfied if two adjacent color blocks do not have the same printing ink; wherein said printing ink is the ink within the region where the distance from the trapping edge is no more than the setting value D, wherein the value of D is less than or equal to the trapping width.

5. A method for automatic trapping according to claim 3, wherein the color trapping condition is satisfied if two adjacent color blocks (color block A and color block B) have the same ink and meet the following two conditions:
  i) Color block A and color block B have at least two kinds of the same printing ink which meet the qualification: |InkS(A)−InkS(B)| is higher than the Minimum Ink Difference; wherein the Minimum Ink Difference is the difference of minimum printing ink set by the user and could be any value ranging from 0% to 100%; and
  ii) The dot percentage difference InkS(A)−InkS(B) of each of the two printing ink dots that meet condition i) is a positive number and a negative number, respectively; wherein, InkS(A)−InkS(B) is the dot percentage difference of same ink S, and said dot percentage difference is the result of the dot percentage of ink S in color block A minus the dot percentage of ink S in color block B.

6. A method for automatic trapping according to claim 2, wherein said pullback trapping condition is satisfied if after converting the ink components of the color blocks around the trapping edge into LAB color space and calculating the total luminance L, the heaviest ink luminance L1 and the lightest ink luminance L2, the ink dot percentage of the heaviest ink is greater than 45%, L1 is less than 65, and the value difference ΔL between L2 and L is within a set range.

7. A method for automatic trapping, comprising:
  (1) translating trapping objects into simple color blocks;
  (2) obtaining the trapping edge by scanning and obtaining the public boundaries of all the adjacent color blocks;
  (3) determining whether the color blocks around the trapping edge satisfy the trapping conditions or not; and if not, dropping those color blocks;
  (4) executing region analysis by setting a central color block and combining the relations with all the surrounding color blocks to conduct trapping edge connections;
  (5) generating trapping region shape, filling ink and subtracting ink for trapping region;
wherein said trapping edge connections in step (4) comprise firstly performing one-to-many trapping edge connections, then performing many-to-one trapping edge connections, and lastly performing many-to-many trapping edge connections.

8. A method for automatic trapping according to claim 7, wherein said one-to-many trapping edge connections are made by obtaining all the outward trapping boundaries from said color block, and connecting the two trapping boundaries as a new trapping edge if two outward trapping boundaries are adjacent.

9. A method for automatic trapping according to claim 7, wherein said many-to-one trapping edge connections are made by obtaining a trapping edge by taking out all the inward trapping boundaries for each color block that did not perform the one-to-many trapping edge connections, and connecting the two trapping boundaries as a new trapping edge if two inward trapping boundaries are adjacent.

10. A method for automatic trapping according to claim 7, wherein said many-to-many trapping edge connections are made by obtaining a trapping edge with common points for any trapping edge which did not perform said one-to-many or many-to-one trapping edge connections; repeating the above step until it can no longer connect; and connecting two trapping boundaries as a new trapping edge if two trapping boundaries have the same trapping direction.

11. A method for automatic trapping, comprising:
  (1) translating trapping objects into simple color blocks;
  (2) obtaining the trapping edge by scanning and obtaining the public boundaries of all the adjacent color blocks;
  (3) determining whether the color blocks around the trapping edge satisfy the trapping conditions or not; and if not, dropping those color blocks;
  (4) executing region analysis by setting a central color block and combining the relations with all the surrounding color blocks to conduct trapping edge connections;
  (5) generating trapping region shape, filling ink and subtracting ink for trapping region;
wherein said trapping region generating step in step (5) comprises a step to determine whether the conditions for generating a smooth transition trapping region are satisfied or not; wherein said determination step comprises combining multiple entering color blocks as the new entering color blocks; combining multiple entered color blocks as the new entered color blocks for those trapping boundaries which are undergoing trapping edge connections; and determining if the conditions for generating a smooth transition trapping region are satisfied or not.

12. A method for automatic trapping according to claim 11, wherein if said conditions for generating a smooth transition trapping region are satisfied, then said trapping region generating step in step (5) further comprises dissecting the trapping edge to generate satellite lines on both sides of the trapping edge; determining the shape of two-sides satellite lines along dissection points on the trapping boundaries by adjusting the location of the corresponding points on two-sides satellite lines based on luminance; and generating trapping region shape according to the endpoint type and cutting mode.

13. A method for automatic trapping according to claim 12, wherein if said conditions for generating a smooth transition trapping region are satisfied, then said trapping region generating step in step (5) further comprises:
  i) calculating the two-sides color block luminance L of a certain dissection point Q on both sides of the trapping edge;
  ii) setting the lower luminance value as L1, and the corresponding point of the dissection point on the other side of the satellite line as Q1; setting the higher luminance value as L2, and the corresponding point of the dissection point on the other side of the satellite line as Q2; calculating Z; wherein Z is equal to L1/L2;
  iii) keeping Q1 and adjusting Q2 to coincide with dissection point Q if Z is less than or equal to the smooth transition parameter;
  iv) adjusting the corresponding points Q1 and Q2 to the dissection point Q along the straight line which pass through the dissert point Q, the corresponding point Q1, and the corresponding point Q2 to make |Q2Q|L2=|QQ1|L1 and |Q1Q|+|QQ2|=trapping width if Z is higher than the smooth transition parameter;
  v) adjusting the shape of the two-sides satellite lines.

14. A method for automatic trapping according to claim 11, wherein if said conditions for generating a smooth transition trapping region are not satisfied, then said trapping region generating step in step (5) further comprises generating satellite lines along the parallel line segments at the side of the entered color block according to the trapping edge obtained by trapping parameters; and generating trapping region shape accordance to the endpoint types and cutting mode.

15. A method for automatic trapping according to claim 12, wherein said endpoint types consist of square shape and natural extension; wherein said square shape is the shape which connects the trapping edge and the corresponding endpoints on the satellite line; and wherein said natural extension is the shape which connects the trapping edge and the corresponding endpoints on the satellite line, with two ends of the trapping edge entering the two tangents of the color block, and the endpoints of the satellite line falling over the tangent.

16. A method for automatic trapping according to claim 12, wherein said cutting mode consists of edge cutting mode and axial cutting mode; wherein said edge cutting mode refers to cutting along the edge of the entered color block when the entered color block is being trapped by another color block to make sure the trapping region does not exceed the entered color block; and wherein said axial cutting mode refers to cutting along the middle axis of the entered color block to make sure the trapping region does not exceed the center of the entered color block.

17. A method for automatic trapping, comprising:
(1) translating trapping objects into simple color blocks;
(2) obtaining the trapping edge by scanning and obtaining the public boundaries of all the adjacent color blocks;
(3) determining whether the color blocks around the trapping edge satisfy the trapping conditions or not; and if not, dropping those color blocks;
(4) executing region analysis by setting a central color block and combining the relations with all the surrounding color blocks to conduct trapping edge connections;
(5) generating trapping region shape, filling ink and subtracting ink for trapping region;
wherein said filling and subtracting trapping ink step in step (5) further comprises determining whether to perform trapping connections or not; dissecting the trapping boundaries generated after trapping region connections; and filling and subtracting trapping ink according to different trapping types; and wherein said dissecting step consists of dissecting along the edge of entered color block for one-to-many trapping boundaries generated after trapping region connections.

18. A method for automatic trapping, comprising:
(1) translating trapping objects into simple color blocks;
(2) obtaining the trapping edge by scanning and obtaining the public boundaries of all the adjacent color blocks;
(3) determining whether the color blocks around the trapping edge satisfy the trapping conditions or not; and if not, dropping those color blocks;
(4) executing region analysis by setting a central color block and combining the relations with all the surrounding color blocks to conduct trapping edge connections;
(5) generating trapping region shape, filling ink and subtracting ink for trapping region;
wherein said filling and subtracting trapping ink step in step (5) further comprises determining whether to perform trapping connections or not; dissecting the trapping boundaries generated after trapping region connections; and filling and subtracting trapping ink according to different trapping types wherein said dissecting step consists of dissecting the trapping region along the bisect line of the angle between the trapping edge connection points of the entered color block for many-to-one trapping boundaries generated after trapping region connections.

19. A method for automatic trapping, comprising:
(1) translating trapping objects into simple color blocks;
(2) obtaining the trapping edge by scanning and obtaining the public boundaries of all the adjacent color blocks;
(3) determining whether the color blocks around the trapping edge satisfy the trapping conditions or not; and if not, dropping those color blocks;
(4) executing region analysis by setting a central color block and combining the relations with all the surrounding color blocks to conduct trapping edge connections;
(5) generating trapping region shape, filling ink and subtracting ink for trapping region;
wherein said filling and subtracting trapping ink step in step (5) further comprises determining whether to perform trapping connections or not; dissecting the trapping boundaries generated after trapping region connections; and filling and subtracting trapping ink according to different trapping types; and wherein said dissecting step consists of an Area Ratio method for many to one trapping boundaries generated after trapping region connections; wherein said Area Ratio Method comprises:
i) drawing a small circle around the connection point of the trapping edge; wherein the small circle and two entering color blocks form two small regions with their areas being S1 and S2, respectively;
ii) locating the dividing line so that the angle between the trapping edge connection points of the entered color block is divided into two angles, a and b, according to the ratio $S1/S2=a/b$;
iii) dissecting the trapping region to obtain dissected trapping region using this dividing line.

20. A method for automatic trapping, comprising:
(1) translating trapping objects into simple color blocks;
(2) obtaining the trapping edge by scanning and obtaining the public boundaries of all the adjacent color blocks;
(3) determining whether the color blocks around the trapping edge satisfy the trapping conditions or not; and if not, dropping those color blocks;
(4) executing region analysis by setting a central color block and combining the relations with all the surrounding color blocks to conduct trapping edge connections;
(5) generating trapping region shape, filling ink and subtracting ink for trapping region;
wherein said filling and subtracting trapping ink step in step (5) further comprises determining whether to perform trapping connections or not; dissecting the trapping boundaries generated after trapping region connections; and filling and subtracting trapping ink according to different trapping types; wherein said dissecting step consists of dissecting along the edge of entered color block for many-to-many trapping boundaries generated from trapping region connections.

21. A method for automatic trapping, comprising:
(1) translating trapping objects into simple color blocks;
(2) obtaining the trapping edge by scanning and obtaining the public boundaries of all the adjacent color blocks;
(3) determining whether the color blocks around the trapping edge satisfy the trapping conditions or not; and if not, dropping those color blocks;
(4) executing region analysis by setting a central color block and combining the relations with all the surrounding color blocks to conduct trapping edge connections;
(5) generating trapping region shape, filling ink and subtracting ink for trapping region;
wherein said filling and subtracting trapping ink step in step (5) further comprises determining whether to perform trapping connections or not; dissecting the trapping boundaries generated after trapping region connections; and filling and subtracting trapping ink according to different trapping types; wherein said dissecting step being an Area Ratio method for many to many trapping boundaries generated after trapping region connections, wherein said Area Ratio Method comprises:

i) drawing a small circle around the connection point of the trapping edge; wherein the small circle and two entering color blocks form two small regions with their area being S1 and S2, respectively;

ii) locating the dividing line so that the angle between the trapping edge connection points of the entered color block is divided into two angles, a and b, according to the ratio $S1/S2=a/b$;

iii) dissecting the trapping region to obtain dissected trapping region using this dividing line.

22. A method for automatic trapping, comprising:
    (1) translating trapping objects into simple color blocks;
    (2) obtaining the trapping edge by scanning and obtaining the public boundaries of all the adjacent color blocks;
    (3) determining whether the color blocks around the trapping edge satisfy the trapping conditions or not; and if not, dropping those color blocks;
    (4) executing region analysis by setting a central color block and combining the relations with all the surrounding color blocks to conduct trapping edge connections;
    (5) generating trapping region shape, filling ink and subtracting ink for trapping region;

wherein said filling and subtracting trapping ink step in step (5) further comprises determining whether to perform trapping connections or not; dissecting the trapping boundaries generated after trapping region connections; and filling and subtracting trapping ink according to different trapping types; wherein the ink filling and subtracting step comprises, filling the darkest ink components of the entered color black for pullback trapping and setting the ink dot percentage of the other ink components to be 0.2%;

filling the ink components of the entering color block for color trapping and adjusting the percentage of its ink dot according to trapping parameters; and iii) removing the same ink component in the trapping region if the trapping region and the entered region contain a same ink component, and the ink dots percentage of the trapping region is less than the ink dot percentage of the entered region.

\* \* \* \* \*